United States Patent

[11] 3,632,251

[72] Inventor Donald E. Henry
 Davenport, Iowa
[21] Appl. No. 812,482
[22] Filed Aug. 26, 1968
[45] Patented Jan. 4, 1972
[73] Assignee Gulf & Western Industries, Inc.
 New York, N.Y.

[54] PROCESS CONTROL SYSTEM
 8 Claims, 3 Drawing Figs.
[52] U.S. Cl............................................ 425/166,
 318/616, 318/663, 425/247
[51] Int. Cl............................................ B29c 3/06
[50] Field of Search............................ 18/2 I, 13
 C, 16 C, 30 CK

[56] References Cited
 UNITED STATES PATENTS
3,044,389 7/1962 Redford .................... 18/16 C
3,254,371 6/1966 Rees ............................ 18/30 CK
3,339,227 9/1967 Ehrenfreund ................ 18/2 I

*Primary Examiner*—H. A. Kilby, Jr.
*Attorney*—Meyer, Tilberry & Body

ABSTRACT: There is provided a process control system for controlling the position of a movable machine member, for example, the movable die member of a plastic molding machine, comprising an actuatable means, such as a solenoid-controlled valve system, for upon energization driving the movable member; circuit means for developing a signal having a value representative of the position of the movable member; and signal monitoring means having a first and a second condition, and being responsive to the value of the signal developed by the circuit means so that when the developed signal attains a predetermined value, the monitoring means is actuated from the first condition to the second condition; the actuatable means is coupled to the monitoring means so that the actuatable means is actuated and deactuated in dependence upon the condition of the monitoring means.

3,632,251

INVENTOR.
DONALD E. HENRY

BY
Meyer, Tilberry & Body
ATTORNEYS

INVENTOR.
DONALD E. HENRY
BY
Meyer, Tilberry & Body
ATTORNEYS

PROCESS CONTROL SYSTEM

This invention pertains to the art of control systems and, more particularly, to a process control system for controlling the operation of a machine.

The invention is particularly applicable in conjunction with machines for injection molding of thermoplastic material and will be described with particular reference thereto, although it will be appreciated that the invention has broader applications, such as a process control system for controlling the position of a movable machine member.

Machines for injection molding of thermoplastic material generally include a fixed die member, a movable die member, actuator means, such as a solenoid-controlled valve system, for driving the movable die member, plastic injection system, and control circuitry for controlling the operation of the machine.

As is well known in the art of injection molding, upon closure of the movable die member with respect to the fixed die member, heated thermosetting plastic is injected through the fixed die member until the cavity formed between the die members is completely filled with plastic. After the injected plastic is allowed to cool and solidify, the movable die member is withdrawn, and the molded plastic article is removed.

Injection molding machines known heretofore, such as the machine illustrated in the U.S. Pat. to B. D. Ashbaugh No. 2,680,883, normally include a set of limit switches to limit the distance travelled in either direction by the movable die member. As the movable die member reaches a preselected limit of travel, the limit switch is actuated to close the solenoid-controlled valve thereby stopping the movable die member. In order to alter the extremities of travel of the movable member, it was necessary that the limit switches be physically moved along the machine to the desired positions. Since the movable die member of an injection molding machine operates at a very high velocity, it is necessary from a safety standpoint that the machine be stopped prior to adjustment of the position of the limit switches.

The present invention is directed toward an improved control system for controlling the position of a movable member, wherein the extremities of travel may be accurately adjusted from a position remote from the machine, thereby providing adjustment while the machine is in operation.

The present invention contemplates a new and improved process control system which overcomes the above referred to problem, and others, and provides a simple control system for machines.

In accordance with the present invention there is provided a process control system for controlling the position of a movable member, comprising an actuatable means for, upon actuation, driving a movable member; circuit means for developing a signal having a value representative of the position of the movable member; and, signal monitoring means having a first and a second condition, and being responsive to the value of the signal developed by the circuit means so that when the developed signal attains a predetermined value the monitoring means is actuated from the first to the second condition; the actuatable means is coupled to the monitoring means so that the actuatable means is actuated and deactuated in dependence upon the condition of the monitoring means.

Still further in accordance with a more limited aspect of the present invention, there is provided a process control system for sequencing a plurality of operations wherein at least one of the operations is the positioning of a movable machine member comprising: an actuatable means for driving the movable machine member; first circuit means having a first and second condition; second circuit means for developing a signal the value of which is representative of the position of the movable machine member; and signal monitoring means being responsive to the value of the signal developed by the second circuit means so that when the signal attains a predetermined value, the monitoring means is actuated from the first condition to the second condition; the actuatable means is coupled to the first circuit means and the monitoring means so that the actuatable means is actuated and deactuated in dependence upon the condition of the first circuit means and the signal monitoring means.

In accordance with a more limited aspect of the present invention, there is provided a variable means for varying the value at which the monitoring means is actuated so that the position of the movable member at which the actuatable means is actuated and deactuated may be altered.

In accordance with a more limited aspect of the present invention, the actuatable means takes the form of a solenoid-operated valve system which drives a movable machine member to a preselected position.

Still further in accordance with a more limited aspect of the present invention, the movable machine member takes the form of a movable die member of an injection molding machine for thermosetting plastic.

The primary object of the present invention is to provide a process control system for positioning a movable machine member, wherein the position of the movable member may be accurately controlled from an operating position remote from the machine.

Another object of the present invention, is to provide a process control system for precisely positioning a movable machine member.

A still further object of the present invention is to provide a process control system for sequencing a plurality of machine operations in which at least one of the operations is the positioning of a movable machine member.

Another object of the present invention is to provide a solid-state process control system for controlling the position of a movable die member of a plastic molding machine.

A still further object of the present invention is to provide a control system for positioning a movable machine member without the use of limit switches.

A still further object of the present invention is to provide a control system in which the voltage monitoring circuits provide positive switching when employed with high-impedance, low-current consumption, position-indicating potentiometers.

Another object of the present invention is to provide a process control system having a relatively low current consumption.

A still further object of the present invention is to provide a process control system utilizing a triac control device for switching the alternating current line supply across the actuatable means.

A still further object of the present invention is to provide a process control system wherein the actuating means for controlling the machine operations are actuated when the alternating voltage line supply attains a predetermined voltage level.

A still further object of the present invention is to provide a process control system for sequencing and controlling a plurality of operations for an injection molding machine for thermoplastic.

Another object of the present invention is to provide a process control system for sequencing a plurality of machine operations in which each operation is precisely timed.

The foregoing objects and other advantages of the invention will become more readily apparent from the following description of the preferred embodiments illustrated in the accompanying drawings wherein.

Figure 1:
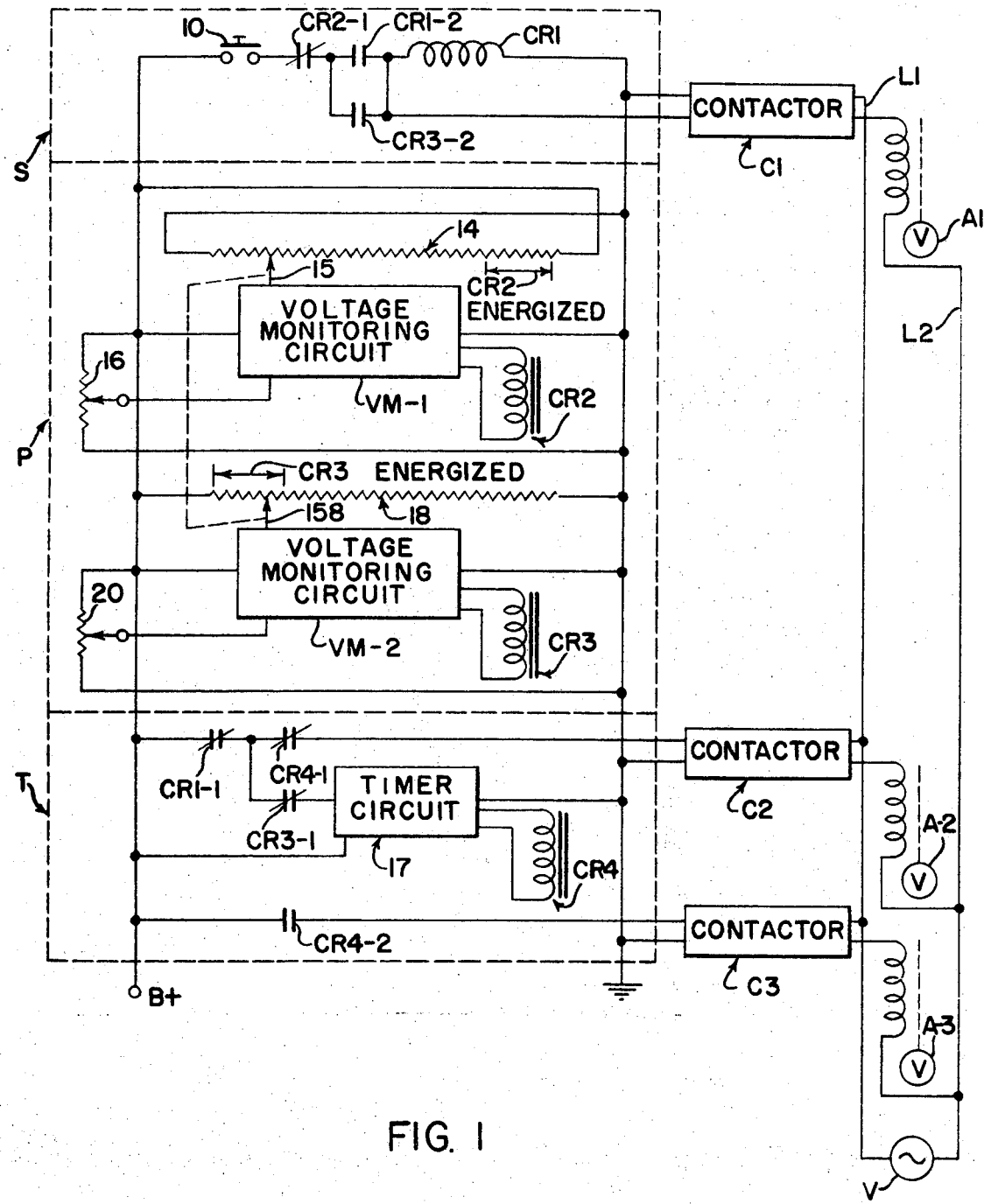
FIG. 1 is a schematic illustration of the preferred embodiment of an electronic control system incorporating sequencing, timing, and positioning control circuitry.

Reference is now made to FIG. 1 which illustrates an electronic control system incorporating a sequencing circuit S, positioning circuit P, timing circuit T, contactors C1 through C3, and solenoid-operated valves A1 through A3. Preferably, a direct current B+ supply source is connected to the control circuitry, and an alternating current supply source V is connected to the controlled valves A1 through A3.

SEQUENCING AND POSITIONING CIRCUITS

As illustrated in FIG. 1, the control system includes a normally open switch 10 connected between the B+ supply source and one terminal of the normally closed contacts CR2-1 of a relay CR2. In the preferred embodiment electromechanical relays are employed; however, it is readily apparent that solid-state devices such as transistors could readily be substituted therefor. The other terminal of relay contacts CR2-1 is connected through the normally open contacts CR1-2 of a relay CR1 to one terminal of the coil of relay CR1. The other terminal of the coil of relay CR1 is connected directly to ground. Connected to the junction between relay contacts CR2-1 and CR1-2 is one terminal of normally open contacts CR3-2 of relay CR3. The other terminal of relay contacts CR3-2 is connected to the junction between relay contacts CR1-2 and the coil of relay CR1, and also connected to the other terminal of relay contacts CR3-2 is an input terminal of contactor C1. The other input terminal of contactor C1 is connected directly to ground. Contactor C1 preferably takes the form of a switching circuit as set forth in U.S. Pat. application Ser. No. 730,212, filed Apr. 16, 1968, and entitled "HIGH TEMPERATURE SEMI-CONDUCTOR SWITCHING CIRCUIT," although numerous other load switching circuits or devices could be employed, such as a load relay.

One of the output terminals of contactor C1 is connected directly to a line L1 of the alternating current supply source V, and the other output terminal is connected to one end of the coil of solenoid-operated valve A1. Solenoid-operated valve A1 preferably takes the form of a valve for controlling air pressure to thereby drive a movable machine member 12; however, it is readily apparent that other actuating means, such as an electric motor having a gear arrangement for directly driving movable member 12, could be substituted therefor. The other end of the coil of valve A1 is connected directly to a line L2 of alternating current source V.

A position-indicating potentiometer 14 is connected between the B+ supply source and ground. Potentiometer 14 preferably takes the form of a very high impedance, thin-film potentiometer, such as the Precision Carbon Film Rectilinear Potentiometer Model III, manufactured by Computer Instruments Corporation; however, various types of potentiometers could be employed, for example, a rotary potentiometer could be employed if the movement of the machine member 12 were in a rotary manner. The potentiometer employed is preferably of a very high impedance to limit the total current requirements of the control system, and of extremely smooth and linear resistance variation as the arm 15 is moved along the potentiometer to provide precise positioning of movable machine member 12.

Figure 2:
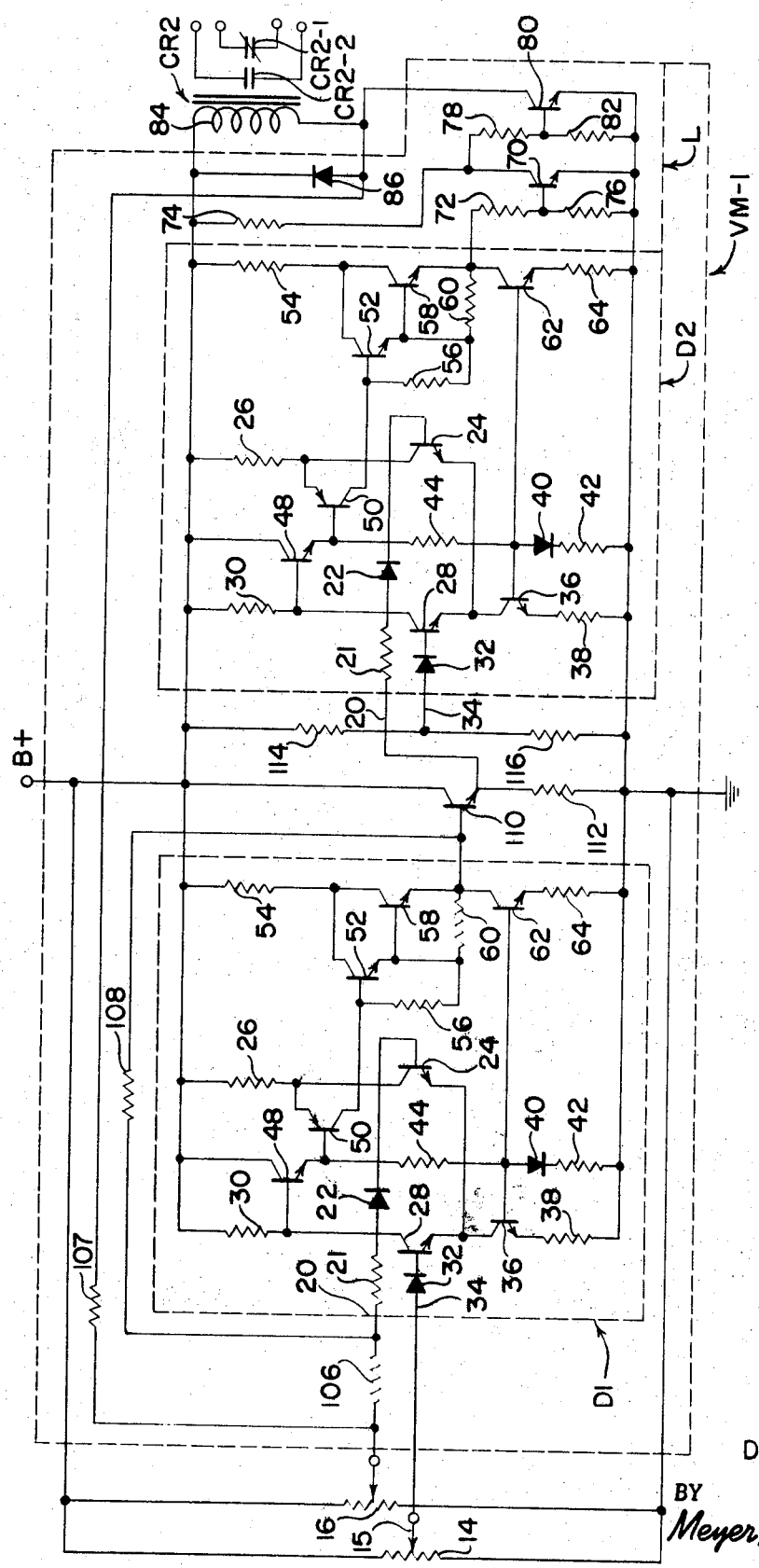
FIG. 2 is a schematic illustration of the voltage monitoring circuit shown in FIG. 1; and, FIG. 3 is a combined block-diagram, schematic illustration of an injection molding machine.

Connected to the arm 15 of potentiometer 14 is the input terminal of a voltage monitoring circuit VM-1, as is more particularly illustrated in FIG. 2. Monitoring circuit VM-1 is connected between the B+ supply source and ground; also connected between the B+ supply source and ground is a potentiometer 16. Voltage monitoring circuit VM-1 is also connected to the arm of potentiometer 16, which potentiometer is preferably mounted remote from the molding machine and which may be adjusted to alter the predetermined or trigger voltage of monitoring circuit VM-1. The output terminals of monitoring circuit VM-1 are connected across the coil of a relay CR2 having normally closed contacts CR2-1.

Figure 3:
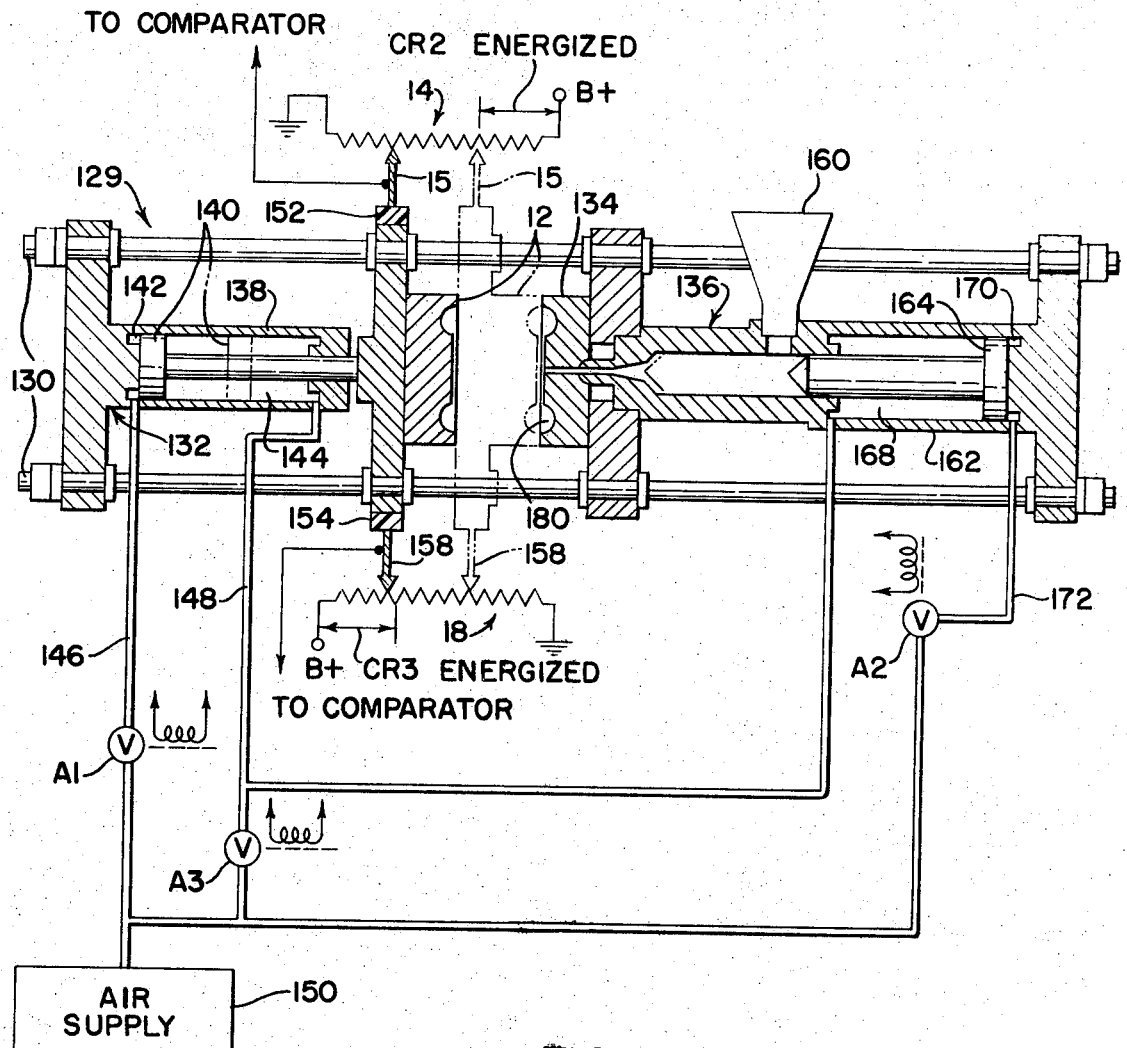

Potentiometers 18 and 20, voltage monitoring circuit VM-2 and relay CR3, are preferably connected in the same manner as potentiometers 14 and 16, voltage monitoring circuit VM-1, and relay CR2, respectively. As is illustrated in FIG. 3, potentiometers 14 and 18 are connected between the B+ supply source and ground; however, these potentiometers are positioned in opposing directions so that as the voltage developed across potentiometer 14 increases in value, the voltage across potentiometer 18 decreases in value.

TIMING CIRCUIT

Normally closed contacts CR1-1 of relay CR1 and normally closed contact CR4-1 of a relay CR4 are connected in series between the B+ supply source and an input terminal of contactor C2. The other input terminal of contactor C2 is connected directly to ground. Connected to the junction between normally closed relay contacts CR1-1 and CR4-1 are the normally closed contacts CR3-1, which are in turn connected to an input terminal of timer circuit 17. Timer circuit 17 preferably takes the form of the circuit disclosed in U.S. Pat. application Ser. No. 580,809, filed Sept. 20, 1966, and entitled "ELECTRONIC TIMER CIRCUIT;" however, as is readily apparent, various electromechanical and electronic timing circuits could be employed. The output terminals of timing circuit 17 are connected across the coil of relay CR4 having normally closed contacts CR4-1 and normally open contacts CR4-2. Timing circuits 17 is also connected between the B+ supply source and ground.

One output terminal of contactor C2 is connected directly to line L1, and the other output terminal is connected to one end of the coil of solenoid-operated valve A2. The other end of the coil of control valve A2 is connected directly to line L2.

Normally open contacts CR4-2 of relay CR4 are connected between the B+ supply source and one input terminal of a contactor C3. The other input terminal of contactor C3 is connected directly to ground. One of the output terminals of contactor C3 is connected directly to line L1, and the other terminal is connected through control valve A3 to line L2, similar to contactors C1 and C2. Solenoid-controlled valves A1 through A3, and contactors C1 through C3 are preferably of the same type; however, depending on the particular machine operation, various combinations of control valves and contactors could be employed.

VOLTAGE MONITORING CIRCUIT

Voltage monitoring circuit VM-1, preferably takes the form of the circuit disclosed in U.S. Pat. application Ser. No. 755,319, entitled "SIGNAL MONITORING CIRCUIT," and filed on Aug. 26, 1968, now U.S. Pat. No. 3,581,218. Reference is now made to FIG. 2 which more particularly illustrates voltage monitoring circuit VM-1. Since voltage monitoring circuit VM-2 preferably takes the form of a circuit similar to monitoring circuit VM-1 the discussion of monitoring circuit VM-1 is equally applicable to monitoring circuit VM-2.

Voltage monitoring circuit VM-1 includes a differential amplifier D1 connected to potentiometers 14 and 16, and to differential amplifier D2, which is connected to a load circuit L. Normally, numerous circuits such as the circuit illustrated in FIG. 3 are employed in an overall control system, such as in an industrial process control system; therefore, position-indicating potentiometer 14 is preferably of a very high impedance so that a smaller B+ direct-current power supply may be employed to supply the total current requirements for the system.

Differential amplifiers D1 and D2 are basically similar circuits, and therefore corresponding elements of these circuits will be denoted with the same numeral, and a single description will be presented therefor. Differential amplifiers D1 and D2 include an inverting input terminal 20 which is connected through a resistor 21 to the anode of a diode 22 having its cathode connected to the base of an NPN-transistor 24. The collector of transistor 24 is connected through a resistor 26 to the B+ supply source, and the emitter of this transistor is connected directly to the emitter of a NPN-transistor 28. The collector of transistor 28 is connected through a resistor 30 to the B+ supply source, and the base of this transistor is connected to the cathode of a diode 32. The anode of diode 32 is connected to a noninverting input terminal 34. Also connected to the emitter of transistor 28 is the collector of a NPN-transistor 36, having its emitter connected through a resistor 38 to ground. The base of transistor 36 is connected to the anode of a diode 40, having its cathode connected through a resistor 42 to ground. The base of transistor 36 is also connected through a resistor 44 to the emitter of a NPN-transistor 48, and the base of this transistor is connected to the collector of transistor 28. The collector of transistor 48 is connected directly to the B+ supply source.

Also connected to the emitter of transistor 48 is the base of a PNP-transistor 40, having its emitter connected to the collector of transistor 24. The collector of transistor 50 is connected to the base of a NPN-transistor 52, and the collector of transistor 52 is connected through a resistor 54 to the B+ supply source. Also connected to the base of transistor 52 is a resistor 56 which is in turn connected to the emitter of this transistor. The emitter of transistor 52 also is connected to the base of a NPN-transistor 58 having its collector connected directly to the collector of transistor 52. The emitter of transistor 58 is connected through a resistor 60 to the base of this transistor and the emitter of transistor 52. Also connected to the emitter of transistor 58 is the collector of a NPN-transistor 62 having its emitter connected through a resistor 64 to ground. The base of transistor 62 is connected directly to the base of transistor 36.

Load circuit L includes a NPN-transistor 70 having its base connected through a resistor 72 to the collector of transistor 62 of differential amplifier D2. Connected through a resistor 74 to the B+ supply source is the collector of transistor 70, and the emitter of this transistor is connected directly to ground. The base of transistor 70 is also connected through a resistor 76 to ground. Also connected to the collector of transistor 70 is a resistor 78 which is connected to the base of a NPN-transistor 80. The emitter of transistor 80 is connected directly to ground, and the base of this transistor is also connected through a resistor 82 to ground. The collector of transistor 80 is connected through the coil of relay CR2 to the B+ supply source, also, the collector of transistor 80 is connected to the anode of a diode 86 having its cathode connected directly to the B+ supply source.

Connected to the noninverting input terminal 34 of differential amplifier D1 is the movable arm 15 of potentiometer 14, and as illustrated in FIGS. 1 and 2, the stationary terminals of this potentiometer are connected between the B+ supply source and ground. Also connected between the B+ supply source and ground is potentiometer 16 having its movable arm connected through a resistor 106 to the inverting input 20 of differential amplifier D1. The movable arm of potentiometer 16 is also connected through a resistor 107 to the collector of transistor 80, and the inverting input 20 of differential amplifier D1 is connected through a resistor 108 to the collector of transistor 62 of differential amplifier D1.

The collector of transistor 62 of differential amplifier D1 is also connected directly to a NPN-transistor 110, having its collector connected to the B+ supply source. The emitter of transistor 110 is connected through a resistor 112 to ground, and to the inverting input 20 of differential amplifier D2. Noninverting input terminal 34 of differential amplifier D2 is connected through a resistor 114 to the B+ supply source, and through a resistor 116 to ground.

INJECTION MOLDING MACHINE

Reference is now made to FIG. 3, which basically illustrates an injection molding machine 129 which is preferably employed with the above-described process control circuitry; however, it is to be appreciated that the control circuit may be employed with various other machines, for example a lathe or elevator.

As illustrated in FIG. 3, plastic molding machine 129 generally includes a set of tracks 130 having mounted thereon a valve assembly 132, movable die member 12, fixed die member 134, and plastic injection assembly 136. Valve assembly 132, is preferably mounted stationary with respect to tracks 130, and is comprised of an outer chamber 138 having a piston 140 mounted within to thereby define a first chamber 142 and a second chamber 144. The first and second chambers 142, 144 are coupled through a pair of tubes 146, 148, respectively, and solenoid-controlled valves A1, A3, respectively, to an air supply 150. Valves A1 and A3 are preferably solenoid-driven valves for controlling the flow of air from air supply 150 to chambers 142 and 144, respectively.

Movable die member 12 is coupled through insulating portions 152 and 154 to a pair of conductive arms 15 and 158, respectively, of potentiometers 14 and 18, respectively.

Plastic injection assembly 136 is generally comprised of a hopper 160 which extends generally perpendicular to the axis of a cylinder 162. Situated within cylinder 162 is a piston 164 which defines a first chamber 168 and a second chamber 170. Chamber 170 is coupled through a tube 172 and control valve A2 to air supply 150, and chamber 168 is coupled through a tube 173 and control valve A3 to air supply 150.

OPERATION

Upon closure of normally open switch 10, relay CR1 is initially energized through relay contacts CR2–1 and CR3–2. It should be noted that initially contacts CR3–2 are closed since voltage monitoring circuit VM–2 is initially energized. When movable die member 12 begins to close, voltage monitoring circuit VM–2 will become deenergized to thereby open relay contacts CR3–2; however, upon initial energization of relay CR1, contacts CR1–2 will close to thereby cause relay CR1 to remain energized after contacts CR3–2 open.

When contacts CR2–1 and contacts CR3–2 or CR1–2 close, the B+ supply source is applied to the input terminals of contactor C1, which in turn energizes solenoid-controlled valve A1. Upon energization of control valve A1, air supply 150 is coupled to chamber 142 of valve assembly 132 to thereby drive movable die member 12 to a closed position.

As movable die member 12 reaches a preselected closed position, the voltage developed at the arm 15 of potentiometer 14, i.e., voltage applied to the inverting input 34, will attain a voltage equal to a predetermined value, or the trigger voltage, of monitoring circuit VM–1 as set into the circuit by potentiometer 16. Potentiometer 16, being located remote from the molding machine, is adjusted to vary the trigger voltage of monitoring circuit VM–1 to thereby alter the closed position of movable die 12.

When the voltage applied to monitoring circuit VM–1 attains a predetermined voltage, relay CR2 is energized to thereby open normally closed contacts CR2–1. Upon opening relay contacts CR2–1, contactor C1 is deenergized to thereby close valve A1. Also upon opening of contacts CR2–1, relay CR1 will become deenergized to thereby close normally closed contacts CR1–1. Upon closure of contacts CR1–1, contactor C2 will become energized through normally closed contacts CR4–1 to thereby open valve A2.

When valve A2 is open, air supply 150 is coupled to valve chamber 170 to drive piston 164 to a closed position, thereby injecting thermosetting plastic into chamber 180.

Further, when contacts CR1–1 are closed, timer circuit 17 will be coupled to the B+ supply source through normally closed contacts CR3–1. When the B+ supply source is connected to timing circuit 17, a timing cycle will commence, and upon timeout relay CR4 will become energized. The time period of timer circuit 17 is set to be equal to the time required for the injected thermosetting plastic to solidify. Upon timeout of timing circuit 17, relay CR4 will become energized to thereby open normally closed relay contacts CR4–1, and close normally open relay contacts CR4–2. When contacts CR4–1 open, contactor C2 will become deenergized to close valve A2 thereby terminating the injection operation, and upon closure of contacts CR4–2, contactor C3 will become energized to thereby open valve A3. When valve A3 is opened air supply 150 will be coupled to chambers 144 and 168 to drive pistons 140 and 164, respectively, thereby opening movable die 12 and withdrawing piston 164. As movable die member 12 reaches a preselected open position, i.e., the voltage developed at the arm 158 of potentiometer 18 attains a predetermined value as set by potentiometer 20, relay CR3 will become energized to thereby cause normally closed contacts CR3-1 to open. When contacts CR3-1 open, timing circuit 17 is reset for another cycle of operation, and relay CR4 becomes deenergized to thereby open contacts CR4-2. When contacts CR4-2 open, contactor C3 will become deenergized to close control valve A3. Air supply 150 will be disconnected from chamber 144 upon closure of valve A3 so as to prevent further travel of movable die member 12, thereby completing a cycle of operation.

OPERATION OF VOLTAGE MONITORING CIRCUIT

Reference is now made to FIG. 2 which more particularly illustrates voltage monitoring circuit VM-1, in which it may be seen that as the arm of potentiometer 14 is moved from the bottom portion of the potentiometer, a point will be reached at which the voltage applied to the noninverting input 34 attains a value equal to a comparison voltage set into monitoring circuit VM-1. Transistor 28 will then be biased into conduction and transistor 24 will be reversed biased. The comparison voltage of monitoring circuit VM-1 is varied by changing the movable arm of potentiometer 16 to thereby adjust the bias voltage applied to transistor 24.

When transistor 28 becomes forward biased, a binary "0" signal will be applied to the base of transistor 48 thereby reverse biasing this transistor. By a binary "0" signal is meant a signal approximately equal to ground potential or a slightly negative voltage, and by a binary "1" signal is meant a signal equal to some positive voltage potential. When transistor 48 is reverse biased, a binary "0" signal will be applied to the base of transistor 50 to thereby forward bias this transistor into conduction. When transistor 50 becomes conductive, a binary "1" signal will be applied to the base of transistor 52, which in turn will cause a binary "1" signal to be applied to the base of transistor 58. Upon application of a binary "1" signal to the base of transistor 58, this transistor will become forward biased to thereby apply a binary "1" signal to the base of transistor 110.

When a binary "1" signal is applied to the base of transistor 110, this transistor will become forward biased, thereby applying a binary "1" signal to the inverse input 20 of detector circuit D2. Upon application of a binary "1" signal to the inverting input terminal 20, transistor 24 of detector circuit D2 will become forward biased, thereby reverse-biasing transistor 28. The voltage level at which transistor 14 of detector circuit D2 is forward biased, is determined by the values of resistors 114 and 116. As transistor 28 becomes reverse biased, a binary "1" signal will be applied to the base of transistor 48 to thereby forward bias this transistor into conduction, which in turn will cause a binary "1" signal to be applied to the base of transistor 50. Upon application of a binary "1" signal to the base of transistor 50, this transistor will become reverse biased to thereby apply a binary "0" signal to the base of transistor 52. The application of a binary "0" signal to the base of transistor 52 will cause a binary "0" signal to be applied to the base of transistor 58, which will reverse bias this transistor. When transistor 58 is reverse biased, a binary "0" signal will be applied to the base of transistor 70 thereby reverse biasing this transistor.

When transistor 70 becomes reverse biased, a binary "1" signal will be applied to the base of transistor 80 to thereby forward bias this transistor into conduction. As transistor 80 becomes conductive, a current will flow through the coil of relay CR2 to thereby cause normally open contacts CR2-2 to close, and normally closed contacts CR2-1 to open.

When detector circuit D1 switches from a first condition, or "off" state, to a second condition, or "on" state, the input impedance changes from a very high impedance to a relatively low impedance. The voltage developed at arm 15 of potentiometer 14, which is preferably a very high impedance resistor, will be of a substantially lower valve after switching has occurred than the value prior to switching.

The feedback circuit including resistor 108 prevents detector circuit D1 from switching abruptly from the first condition to second condition to thereby prevent the circuit from oscillating between the two conditions as switching occurs. The feedback circuit provides degenerative feedback which tends to cause detector circuit D1 to revert to the first condition as the circuit commences to change from the first condition to the second condition. For example, when the voltage developed at arm 15 of potentiometer begins to forward bias transistor 28, transistor 24 begins to be reverse biased. As transistor 24 begins to be conductive, the collector of transistor 62 commences to develop a positive signal, which is fed back through resistor 108 to the noninverting input terminal 20. This increasingly positive signal is applied to the base of transistor 24 and causes this transistor to become more conductive, which in turn causes transistor 28 to become less conductive. As may be seen, the feedback signal has the net effect of increasing the switching time, or expanding the period of time in which detector circuit D1 switches from one condition to the other condition. The output signal of detector circuit D1 takes the form of a curve having three distinct segments. Assuming the voltage developed at the arm 15 of potentiometer is less than the predetermined or trigger voltage, the output signal takes the form of a binary "0" signal. During the switching period, the output signal takes the form of a positive slope increasing from a binary 370" signal to a binary "1" signal, the slope of which is substantially greater than the slope of the corresponding input signal. After switching has occurred, the output signal takes the form of a binary "1" signal. Thus, a segment of the output signal takes the form of a signal proportional to the input signal; however, the output signal increases in value at a much greater rate than the input signal.

The output signal of detector circuit D1 is applied through an impedance-matching circuit including transistor 110 to the noninverting input terminal 20 of detector circuit D2. Detector circuit D2 operates as a comparator circuit, and the switching circuit including transistors 24 and 28 is preferably biased to operate at a point on the increasing voltage segment of the curve of the output signal of detector circuit D1. As may readily be seen, detector circuit D2 will switch abruptly and positively from a first condition to a second condition without oscillating. Since the signal applied to the noninverting input terminal 20 of this circuit increases in value at a relatively high rate of speed, and no oscillations are present on this input signal.

The feedback path including resistor 107 causes relay CR2 to switch positively from an "off" to an "on" condition. When relay CR2 commences to be energized through resistor 80, a binary "0" signal is fed back to the inverting input 20 to completely reverse bias transistor 24, thereby maintaining detector circuit D1 in a second condition once switching commences.

Although the invention has been shown in connection with the preferred embodiments, it will be readily apparent to those skilled in the art that various changes in from an arrangement of parts may be made without departing from the spirit and scope of the invention as defined by the appended claims.

I claim:

1. An injection molding machine for molding articles of plastic material comprising:
   a first die member, and a second die member having an open position and a closed position to thereby define a cavity between said parts;
   injection means for, upon actuation, injecting said plastic material into said cavity;
   actuatable means coupled to said first die member for, upon actuation, driving said first die member from the open position to the closed position,
   circuit means for developing an electrical signal varying in value with the position of said first die member; and,
   signal monitoring means having a first and a second condition, and being responsive to said electrical signal developed by said circuit means so that when said signal attains a predetermined value said monitoring means is actuated from said first condition to said second condition, said actuatable means and said injection means being coupled to said monitoring means so that said actuatable means is actuated and deactuated, and said injection means is actuated, in dependence upon the condition of said signal monitoring means:

said signal monitoring means including an amplifier having an input responsive to deviation of said electrical signal from said predetermined value and having an output, said amplifier having a feedback connection from said output to said input connected to provide degenerative feedback and said monitoring means being actuated from said first condition to said second condition in dependence upon the magnitude and polarity of said amplifier output said degenerative feedback tending to weaken the output of said amplifier and to cause the signal monitoring means to revert to the first condition as the circuit commences to change from the first condition to the second condition to avoid abrupt movement and overshoot in the movement of said first die member.

2. An injection molding machine as defined in claim 1 wherein said actuatable means includes a solenoid-controlled valve means.

3. An injection molding machine for molding articles of plastic material comprising:

A first die member, and a second die member having an open position and a closed position to thereby define a cavity between said parts;

injection means for, upon actuation, injecting said plastic material into said cavity;

actuatable means including a solenoid-controlled valve means coupled to said first die member for, upon actuation, driving said first die member from the open position to the closed position, circuit means for developing an electrical signal having a value representative of the position of said first die member;

a reference voltage source producing a reference signal of predetermined value, and signal monitoring means having a first and a second condition, and being responsive to said signal developed by said circuit means so that when said signal attains said predetermined value said monitoring means is actuated from said first condition to said second condition; said actuatable means and said injection means being coupled to said monitoring means so that said actuatable means is actuated and deactuated, and said injection means is actuated, in dependence upon the condition of said signal monitoring means, said signal monitoring means including a differential amplifier having a first input responsive to said electrical signal, a second input responsive to said reference signal, and an output for developing a comparison signal, said amplifier having a connection from the output to one of the inputs poled for causing degenerative feedback, and said monitoring means being actuated from said first condition to said second condition in dependence upon value of said comparison signal, said degenerative feedback tending to weaken the output of said amplifier and said comparison signal and to cause the signal monitoring means to revert to the first condition as the circuit commences to change from the first condition to the second to avoid abrupt movement and overshoot of the movement of said first die member.

4. A process control system for controlling the position of a movable machine member comprising:

actuatable means for, upon actuation, driving a said movable member;

circuit means for developing a signal having a value representative of the position of said movable member; and, signal monitoring means having a first and second condition, and being responsive to said signal developed by said circuit means so that when said signal attains a predetermined value said monitoring means is actuated from said first condition to said second condition; said actuatable means being coupled to said monitoring means so that said actuatable means is actuated and deactuated in dependence upon the condition of said monitoring means;

said monitoring means including a first differential amplifier, means for developing a comparison signal and a second differential amplifier coupled to the first differential amplifier, said first differential amplifier having inputs from said circuit means and said means for developing a comparison signal, the second differential amplifier having an input from the first differential amplifier and from a normally fixed voltage source and having a relatively fast response in comparison with the first differential amplifier; and said monitoring means being actuated from said first condition to said second condition in dependence upon a particular relationship between the value of said signal developed by said circuit means and the value of said comparison signal.

5. A process control system as defined in claim 4 wherein said means for developing a comparison signal includes a variable means for varying the value of said comparison signal so that the position of the movable member at which said signal monitoring means is actuated from said second condition may be altered to thereby alter the position of a said movable member at which said actuatable means is actuated and deactuated, said first differential amplifier having a degenerative feedback for reducing the speed of response thereof in comparison with the speed of response of the second differential amplifier.

6. A process control system as defined in claim 5 wherein said circuit means includes a potentiometer having a movable terminal for varying the resistance thereof; said terminal adapted to be coupled to said movable machine member and to said signal monitoring means, said variable means for varying the value of said comparison signal comprising a second potentiometer with a movable terminal for varying the value of the comparison signal, said first differential amplifier having one input connected to the movable terminal of the first mentioned potentiometer and a second input connected to the movable terminal of the said second potentiometer and having an output terminal to which the second differential amplifier is connected, said degenerative feedback comprising a resistor connected between the output terminal of the first differential amplifier and one of said inputs of the first differential amplifier.

7. A process control system as defined in claim 6 wherein said signal monitoring means includes an input circuit means coupled to said movable terminal of said first potentiometer, and an output circuit means coupled to said actuatable means for providing an output signal when said signal monitoring means is actuated to said second condition to thereby energize said actuatable means.

8. A process control system as defined in claim 7 wherein said signal monitoring means includes a second circuit means coupling said output circuit means to said input circuit means for varying the value of said comparison signal so that the monitoring means is positively actuated from the first condition to the second condition.

* * * * *